W. JOHNSON.
Butter-Worker.

No. 161,043. Patented March 23, 1875.

Witnesses: J. J. Bonner, Ernest Hoedick

Wallace Johnson, Inventor
By Jay Wyatt, Atty.

UNITED STATES PATENT OFFICE.

WALLACE JOHNSON, OF BUFFALO, NEW YORK.

IMPROVEMENT IN BUTTER-WORKERS.

Specification forming part of Letters Patent No. 161,043, dated March 23, 1875; application filed September 15, 1874.

*To all whom it may concern:*

Be it known that I, WALLACE JOHNSON, of the city of Buffalo, in the county of Erie and State of New York, have invented certain Improvements in Butter-Workers, of which the following is a specification:

My invention relates to that class of machines which are provided with a ribbed or corrugated kneading or working roller, and a movable trough arranged under the same for the reception of the butter to be worked.

The invention consists in the combination, with the ribbed roller and the trough provided with a gear-rack, of a reversing train of wheels connecting the shaft of the roller with the shaft and pinion, operating the trough in such manner that, by a continuous rotary motion of the roller, a reciprocating motion may be imparted to the trough, whereby the butter is alternately spread out and thoroughly kneaded or worked during the movement of the trough in one direction, and rolled up into a pile during the reverse movement of the trough for a repetition of the kneading process.

Figure 1:
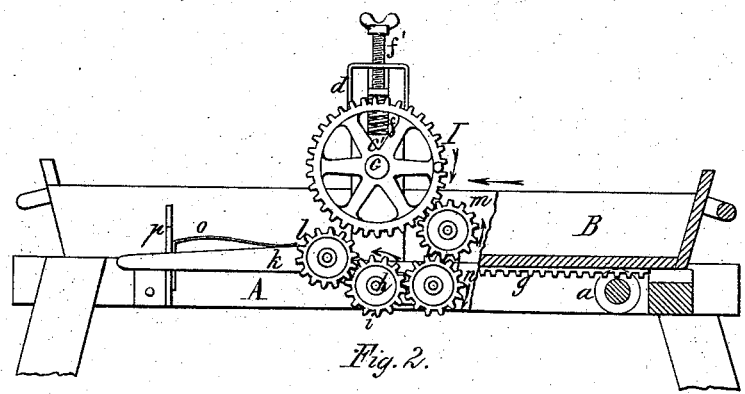
Figure 2:
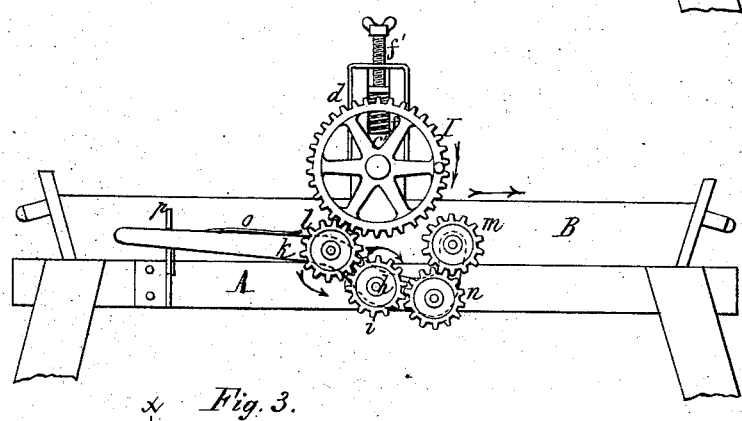
Figure 3:
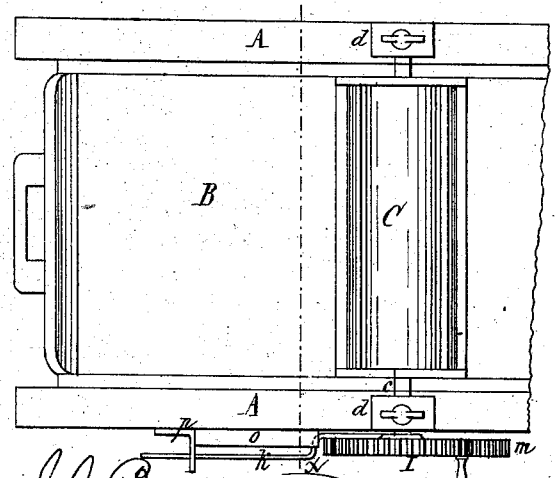
Figure 4:
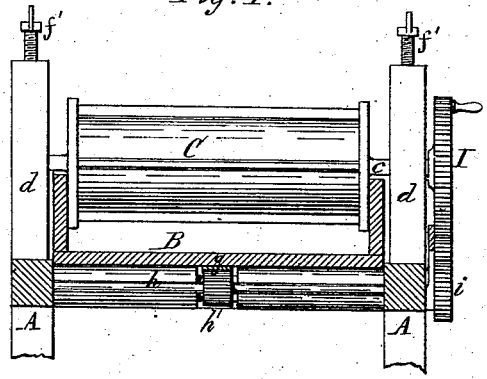

In the accompanying drawing, Figure 1 is a side elevation of my improved worker. Fig. 2 is a similar view with the reversing mechanism shifted. Fig. 3 is a top-plan view of the machine; and Fig. 4, a cross section in line $x$ $x$, Fig. 3.

Like letters of reference designate like parts in each of the figures.

A is the frame of the machine, provided with rollers $a$, supporting the trough B. C is the working-roller, provided with ribs or corrugations, and arranged transversely in the trough B. $c$ is the roller-shaft, held in bearings $c'$, arranged in slotted vertical standards $d$ of the frame A, so as to be capable of vertical play therein. $f$ are spiral springs pressing upon the bearings $c'$, so as to render the roller C yielding; and $f'$, set-screws, by which the tension of the springs $f$ is regulated. $g$ is a gear-rack, secured longitudinally to the under side of the trough B, in the center line thereof; and $h$, a transverse shaft supported in the frame A, and carrying a gear-pinion, $h'$, engaging in the gear-rack $g$. I is a gear-wheel mounted on the outer end of the roller-shaft $c$, and $i$ a pinion secured to the end of the shaft $h$, in the same vertical plane with the wheel I. $k$ is the shifting-lever, turning on the shaft $c$ as a fulcrum, and carrying on one side of its fulcrum a counter-wheel, $l$, interposed between the wheel I and pinion $h$, and on the opposite side a counter-wheel, $m$, and an interposed wheel or idler, $n$, causing the wheel $m$ to revolve in the same direction as the wheel $i$. The wheels $l$, $m$, and $n$ revolve on fulcrum studs or posts secured to the shifting-lever $k$. $o$ is a reacting spring attached to the frame A, or any other fixed part, and bearing upon the long arm of the shifting-lever $k$, so as to retain the same in a depressed position, with the wheel $m$ engaging with the wheel I, as shown in Fig. 1. When the parts are in this position the rotary motion of the roller C is transmitted to the wheel $i$, and the trough B propelled thereby in the direction indicated by the arrows in Fig. 1, while, when the long arm of the shifting-lever $k$ is raised against the spring $o$, so as to bring the wheel $l$ in engagement with the wheel I, the motion of the latter is transmitted to the wheel $i$ in the opposite direction, and the trough is caused to travel in a reversed direction, as indicated by arrows in Fig. 2. During the last movement of the trough the butter placed in one end thereof is spread out and compressed or kneaded by the ribbed roller, while during the reversed movement, the movement of the roller remaining unchanged, the butter so distributed on the bottom of the trough is rolled up or collected again into a mass or pile near one end, when, at the reversal of the movement of the trough, it will again be kneaded and distributed by the roller, as before stated.

By this repeated spreading out and collecting of the butter all parts thereof are equally exposed to the action of the roller, and most thoroughly worked without stopping the machine to turn over or collect the butter in a mass by hand, as is required by the machines now in use.

The position of the lever $k$ is readily reversed by the operator a little before the trough has arrived at either end of its movement, whereby the desired reciprocating movement of the trough is produced while the roller C continues to revolve in the same direction.

The long arm of the shifting-lever moves in contact with a notched plate, $p$, the shoulders of which serve as stops to limit the throw of the lever.

Instead of connecting the roller-shaft $c$ and rack-shaft $h$ by means of the gear mechanism above described, the ordinary belt-reversing mechanism (consisting of an open and twisted or crossed belt, shifted alternately on the tight pulley) may be employed with the same results; but I prefer the gear mechanism on account of compactness and cheapness of construction.

What I claim as my invention is—

The combination, with the ribbed working-roller and the trough having a gear-rack, $g$, of the shaft $h$, pinion $h'$, and reversible transmitting mechanism, whereby the continuous rotary motion of the roller produces a reciprocating motion of the trough, substantially as hereinbefore set forth.

WALLACE JOHNSON.

Witnesses:
J. J. BONNER,
EDWARD WILHELM.